(12) United States Patent
Dudasik

(10) Patent No.: US 6,552,850 B1
(45) Date of Patent: Apr. 22, 2003

(54) DEVICE, METHOD, AND SYSTEM OF DISPLAY FOR CONTROLLED VIEWING

(75) Inventor: Edward Dudasik, West Hills, CA (US)

(73) Assignee: Citicorp Development Center, Inc., Los Angeles, CA (US)

(*) Notice: Subject to any disclaimer, the term of this patent is extended or adjusted under 35 U.S.C. 154(b) by 0 days.

(21) Appl. No.: 09/107,411

(22) Filed: Jun. 30, 1998

(51) Int. Cl.[7] .............................. G02B 5/30; G02B 27/28
(52) U.S. Cl. ........................ 359/501; 359/489; 359/483; 349/16; 349/6; 348/832; 348/35; 160/113; 160/115; 160/127; 109/1 R; 109/10; 109/12; 52/27; 52/36.1
(58) Field of Search ................................ 359/483, 485, 359/487, 489, 490, 493, 495, 500, 501; 349/96, 16; 348/832, 834, 835, 842; 160/113, 115, 127; 109/1 R, 10, 11, 12; 52/27, 36.1

(56) References Cited

U.S. PATENT DOCUMENTS

| 2,102,632 A | * | 12/1937 | Land ........................... 359/493 |
| 2,286,570 A | * | 6/1942 | Pollack |
| 4,009,934 A | * | 3/1977 | Goodwin et al. |
| 4,229,072 A | * | 10/1980 | Torok et al. |
| 4,630,040 A | * | 12/1986 | Haertling |
| 4,812,709 A | | 3/1989 | Dudasik ....................... 313/478 |
| 4,859,994 A | | 8/1989 | Zola et al. .................... 340/705 |
| 4,879,603 A | * | 11/1989 | Berman |
| 4,926,327 A | * | 5/1990 | Sidley |
| 5,066,108 A | * | 11/1991 | McDonald ................... 359/497 |
| 5,287,909 A | | 2/1994 | King et al. ................... 160/135 |
| 5,400,069 A | * | 3/1995 | Braun et al. |
| 5,465,774 A | | 11/1995 | Smith ........................... 160/90 |
| 5,488,496 A | | 1/1996 | Pine .............................. 359/63 |
| 5,583,335 A | * | 12/1996 | Spitzer et al. |
| 5,612,734 A | * | 3/1997 | Nelson et al. |
| 5,686,979 A | | 11/1997 | Weber et al. ................. 349/96 |
| 5,793,470 A | | 8/1998 | Haseltine et al. ............ 353/20 |
| 5,812,226 A | * | 9/1998 | Izumi et al. |
| 5,843,604 A | * | 12/1998 | Julich |
| 6,262,843 B1 | * | 7/2001 | Marx ........................... 359/501 |

FOREIGN PATENT DOCUMENTS

JP            05010079        1/1993

OTHER PUBLICATIONS

European Patent Office–Patent Abstracts of Japan (Publication No. 02116826; Publication Date: May 1, 1990) of Omron Tateisi Electron Co.
European Search Report of Jul. 23, 2002.

* cited by examiner

*Primary Examiner*—Ricky D. Shafer
(74) *Attorney, Agent, or Firm*—George T. Marcou; Kilpatrick Stockton LLP

(57) ABSTRACT

The present invention provides a device, method, and system for secure viewing and use of banking and other electronic access devices. The present invention comprises a computer/video display system that includes a computer with a conventional screen that displays a polarized screen image and a polarized partition that allows viewing of the screen by the user positioned in front of the display, while preventing viewing by secondary observers. The present invention operates in conjunction with a standard liquid crystal display (LCD), using the intact polarizer of the LCD. The present invention is intended to be used in conjunction with an automatic teller machine/customer access terminal (ATM/CAT) or personal computer (PC) to allow privacy of information displayed to the ATM/CAT or PC user, without preventing observation of the ATM/CAT or PC user.

7 Claims, 2 Drawing Sheets

DEVICE, METHOD, AND SYSTEM OF DISPLAY FOR CONTROLLED VIEWING

FIELD OF THE INVENTION

The present invention relates generally to secure viewing and use of banking and other electronic access devices, and in particular to a polarized light screen for use with a polarized access device such that the user of the device privately views the viewing screen of the device. The present invention also addressed the situations necessitating proper security in viewing, particularly the devices displaying LCD information.

BACKGROUND

Users of devices such as automatic teller machines/customer access terminals (ATMs/CATs), as well as other devices that are publicly, semipublicly, or non-publicly accessible in situations in which it is important to maintain nonviewing privacy of the screen, including personal computers (PCs) and other devices having light emitting screens, may have to operate these devices in full view of other observers (nonusers). This operation of the devices by users in view of others prevents the user from having privacy of information protected in the display in the operation, such as performing banking, personal computing, or other functions. This lack of privacy can lead to other problems or concerns for the user, including problems with safety regarding information related to operation of the device or to the safety of the user. This information can include such things as the personal identification number or other access information that could appear on the display screen, the name of the user, and information relating to the user, such as the user's account balance or other transactional information.

As shown in FIG. 1, these devices, such as ATMs/CATs 1 or PCs, generally have display screens 2 that are intended to be viewed by the primary user 3 along the users' line of sight 3a. However, in the known art, secondary observers 4, 5, 6, may be able to view the screen 2 past the primary user 3 along other lines of sight 4a, 5a, 6a. This viewing by secondary observers 4, 5, 6 may occur even if some screen protections are in place, as further discussed below with regard to such devices as that shown in U.S. Pat. No. 4,812,709 to Dudasik.

A need thus exists for methods and devices for protecting the privacy of users of devices having display areas, such as LCDs of ATMs/CATs or PCs. The protective device is needed to allow outside users to see the machine itself, so that potential users know when the device is present, unoccupied, and may be safely approached, but protect only the single current user of the machine at any time. This protection is needed both to assure privacy of displayed information, and to protect the user by allowing full view of the user by such secondary observers as security personnel and security cameras.

One approach to protecting the ATM/CAT, PC, or other device user that has been developed is described in U.S. Pat. No. 4,812,709 to Dudasik, which discloses a privacy screen that limits the angle from which a color CRT display may be viewed. Light control film prevents a second user from viewing the images on the screen from the sides only. The device does not prevent nonusers directly in front of the screen from viewing the images on the screen; these non-users may, for example, look over the shoulder of the user.

Other methods that generally protect areas from viewing, but not specific to such devices as ATMs/CATs or PCs, include the following. Japanese Patent JP05010079 discloses a light shielding window material for buildings that uses light polariztion to prevent viewing from the outside. U.S. Pat. No. 5,686,979 to Weber, et al., discloses a switchable window that uses light polarization to block light transmission. Use of the switchable light transmission states is disclosed as being used in privacy curtains. U.S. Pat. No. 5,287,909 to King, et al., discloses a privacy screen frame that includes translucent panels. U.S. Pat. No. 5,465,774 to Smith describes a privacy frame that includes opaque or translucent insert panels.

Another method that has been used to provide private viewing of LCD displays in general in the prior art is use of polarizing devices, which can function with typical LCD displays. In typical LCD displays, the display is configured with two fixed polarizers sandwiching two glass plates with embedded electrodes that confine a mesomorphic material (see, e.g., U.S. Pat. No. 5,488,496 of Pine). These mesomorphic materials, which are crystalline, have two important properties: 1) light passing through the crystalline material rotates the plane of polarization of the light; and 2) the crystals align to an applied electromagnetic field. Thus, when the crystals are illuminated with a polarized light source and aligned by an electric field, the change in light polarization over the aligned crystalline region is uniform and can be cross-polarized to impede transmission of light.

In practice, typically a first polarizer polarizes light from a light source prior to the light illuminating the crystals. A second polarizer aligned perpendicularly to the first polarizer blocks the light rotated by the crystalline material. Thus, the visible light appearing past the second polarizer is polarized and viewable by the user, allowing display of text and images.

The device of Pine discloses a method and system that utilizes light polarization to prevent a second viewer from viewing the contents of an LCD screen. Specifically, Pine discloses an LCD in conjunction with a remote polarizer used by the user, in which the addition of a remote polarizer allows only the user of the remote polarizer to view text or images on the LCD screen. The device of Pine thus selectively prevents viewing of text or images on the LCD screen through modifications to the polarizers of the LCD screen. The method and system of Pine further include embodiments for allowing selective viewing of the LCD screen by observers, through, for example, selective projection, but allowing a person with a remote polarizer to view all parts of the screen.

An embodiment of Pine includes an LCD display system with at least one of the polarizers associated with creating the cross-polarized image on the LCD display displaceable. The displacement of the polarizer determines the visible and invisible regions of the display.

Another embodiment of Pine uses a remote polarizer (e.g., polarized sunglasses) to provide a narrow viewing angle for the user of the remote polarizer, in conjunction with selective partitioning of the display, thus preventing viewing by other nearby observers.

Uses of Pine described include public viewings, such as projections, and use of laptops or other computers in public places and where it is acceptable to use polarizing devices specific to the user, such as wearing enabling glasses. Also, with Pine, one aspect of the device is that observers of the LCD screen, when prevented from seeing text and images on the screen, see all light emitted from the screen (fully illuminated screen—"white screen").

Pine does not describe specifically use of any embodiment of the device in conjunction with a public use device such as an ATM/CAT. In fact, use of polarized glasses or other features of embodiment of Pine are not practical for use with a typical ATM/CAT. Further, even if the device of Pine were used with an ATM/CAT, nonusers could use the glasses described by Pine to view a screen, just as the ATM/CAT user does.

It is thus clear that there is a need for a practical and simple device and method for preventing nonusers from viewing the screens of such devices as ATMs/CATs and PCs while users are using those devices, and while nonusers have a clear view of the users, and the users have a clear view of the nonusers.

SUMMARY OF THE INVENTION

It is an object of the present invention to provide users of devices such as automatic teller machines/customer access terminals (ATMs/CATs), as well as other devices that are publicly, semipublicly, or non-publicly accessible in situations in which it is important to maintain nonviewing privacy of the screen, including personal computers (PCs) and other devices having light emitting screens, with a system and method that allow the users to operate these devices in fill view of other observers (nonusers). It is a former object of the present invention to address access of such devices as ATMs/CATs and PCs in situations necessitating proper security in viewing, particularly for devices displaying LCD information.

It is a further object of the present invention to provide for use of polarizing screens between the device user and nonusers to allow viewing of the device screen by the user while preventing viewing of the screen by nonusers.

It is a further object of the present invention to provide a method and device for separating the user from nonusers of devices such as ATMs/CATs or PCs such that the nonusers are prevented from viewing the device screen.

It is a further object of the present invention to provide for the protection of users of devices such as ATMs/CATs or PCs using unaltered LCDs screens operating normally. This protection is in the form of allowing clear view of the user by such secondary users as security personnel and security cameras.

It is a further object of the present invention to prevent viewing of text and images on the screen of the device by nonusers, such that the screen appears unilluminated to nonusers. It is a further object of the present invention to allow users of the device to have a clear view of nonusers, and thus provide users with a feeling of safety.

The present invention provides a device, method, and system for secure viewing and use of banking and other electronic access devices, including PCs, and in particular to a polarized light screen for use with a polarized display such that the user of the device privately views the viewing screen of the device.

The present invention comprises a computer/video display system that includes a computer with a conventional LCD screen that displays a polarized screen image, and a polarized partition that allows viewing of the screen by the user positioned in front of the display, while preventing viewing of the display by secondary observers. The present invention operates in conjunction with a standard liquid crystal display (LCD), using the intact polarizer of the LCD. The present invention is intended to be used in conjunction with an ATM/CAT or PC to allow privacy of operation by the ATM/CAT or PC user, without preventing observation of the ATM/CAT or PC user.

Because the light emitted from the LCD, while visible to the user, is polarized, it may be blocked by a third polarizer aligned perpendicularly to the second polarizer. An embodiment of the present invention includes a partition surrounding the user, the partition includes an aligned polarizing material that blocks the polarized light from the LCD. The partition thus allows all objects but the display screen to be viewed freely by observers other than the user, but prevents these observers from viewing the LCD display. This is because the light from all objects other than the light from the display screen is unpolarized light.

To achieve the stated and other objects of the present invention, as embodied and described below, the invention includes a system for a user to view information displayed on a terminal along a first line of sight from the user to the terminal, while preventing an observer from viewing the information displayed along a second line of sight from the observer to the terminal, comprising: a polarized display screen for the terminal, wherein the polarized display screen has a first direction of polarization and wherein the information displayed on the polarized display screen is visible to the user without additional polarization along the first line of sight; and a polarizing partition having a second direction of polarization; wherein the second direction of polarization is substantially perpendicular to the first direction of polarization, such that the information displayed on the polarized display is not readily visible to the observer when the polarizing partition intersects the second line of sight; wherein the polarizing partition is located such that the user may view the terminal without the transparent polarizing partition intersecting the first line of sight; and wherein the polarizing partition is located such that the polarizing partition intersects the second line of sight of the observer.

To achieve the stated and other objects of the present invention, as embodied and described below, the invention further includes a method for providing a user with privacy in viewing displayed information, comprising: displaying the information on a terminal, wherein the displayed information includes light emissions; polarizing the light emissions in a first direction of polarization, such that the polarized light emissions are visible to the user; and polarizing the light emissions in a second direction of polarization, wherein the second direction of polarization is substantially perpendicular to the first direction of polarization, such that the light emissions polarized in the first and second directions is substantially invisible to an observer.

Additional objects, advantages and novel features of the invention will be set forth in part in the description that follows, and in part will become more apparent to those skilled in the art upon examination of the following or upon learning by practice of the invention.

DETAILED DESCRIPTION

The present invention comprises a computer/video display system that includes a computer with a conventional screen that displays a polarized screen image and a polarized partition that allows viewing of the screen by the user positioned in front of the display, while preventing viewing by secondary observers. The present invention operates in conjunction with a standard liquid crystal display (LCD), using the intact polarizer of the LCD. The present invention is intended to be used in conjunction with an automatic teller machine/customer access terminal (ATM/CAT) or personal computer (PC) to allow privacy of operation by the ATM/CAT or PC user, without preventing observation of the ATM/CAT or PC user.

In contrast to the prior art, the present invention uses a polarizer between the LCD screen and observers other than the user to prevent those observers from viewing text or images on the LCD screen. Also in contrast to the prior art, the present invention operates with an unaltered LCD screen operating normally. The present invention thus prevents viewing by observers only when the polarizing partition is in place between observers and the LCD screen.

An intended use of the present invention is therefore to provide private viewing of LCD screens for ATMs/CATs or PCs where use of enabling glasses are unacceptable. Another difference with the prior art is that, with the present invention, observers are prevented from seeing text and images on the screen see a screen with no emitted light (unilluminated screen—"black screen").

An embodiment of the present invention includes a partition that substantially surrounds the user to prevent non-users from viewing the display, the partition includes an aligned polarizing material that blocks the polarized light from the LCD. The partition thus allows non-polarized light to be viewed freely by observers other than the user, but prevents these observers from viewing the LCD display. The physical construction of the frame allows users access to the device by, for example, providing sufficient open space around the frame to allow passage or by providing a door.

References will now be made in detail to an embodiment of the present invention, an example of which is illustrated in the accompanying drawing.

Figure 1:
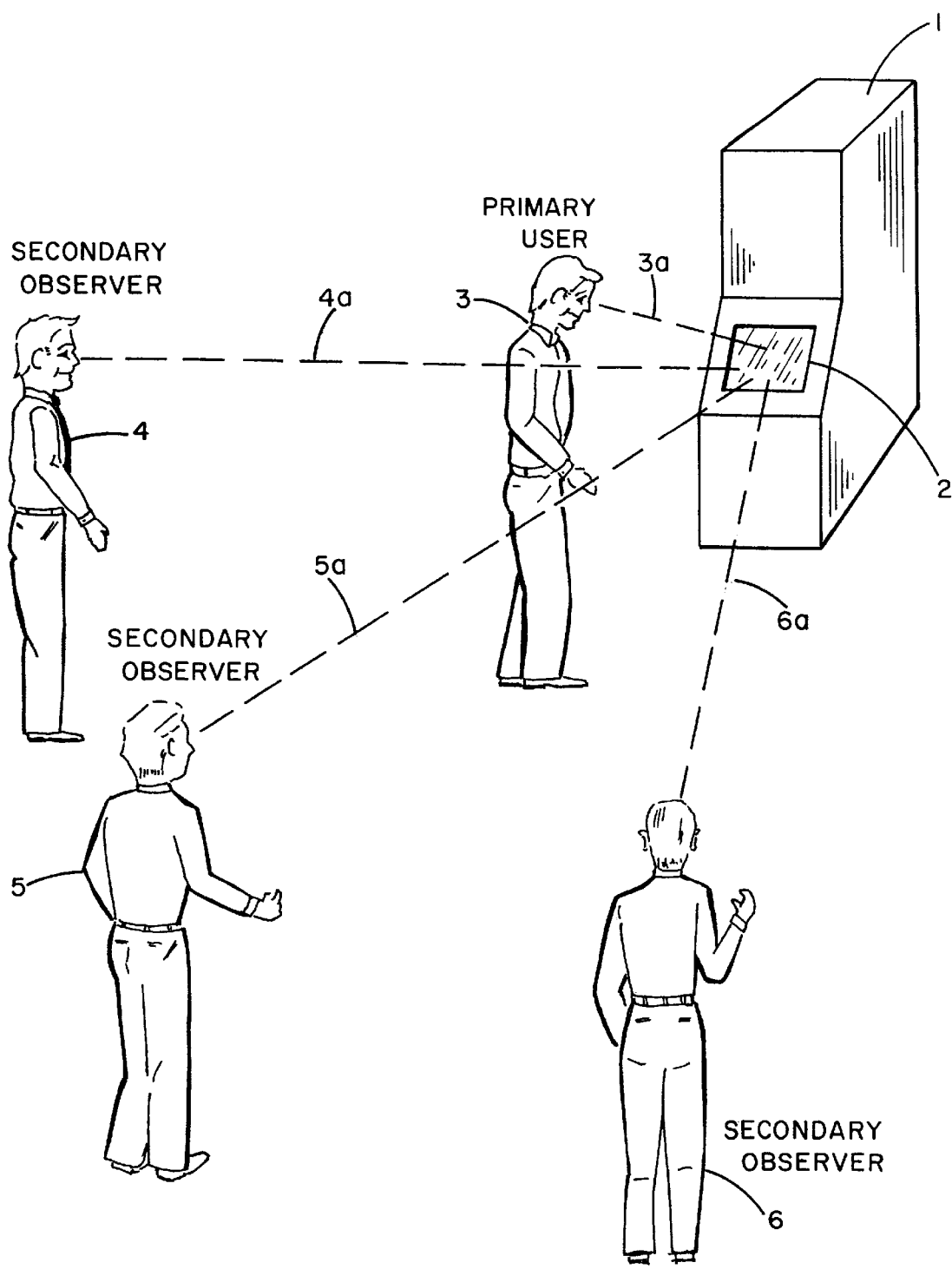
FIG. 1 depicts typical use of a device such as an ATM/CAT for the prior art, in which secondary observers are not prevented from viewing the screen of the device while in use by a user.
Figure 2:
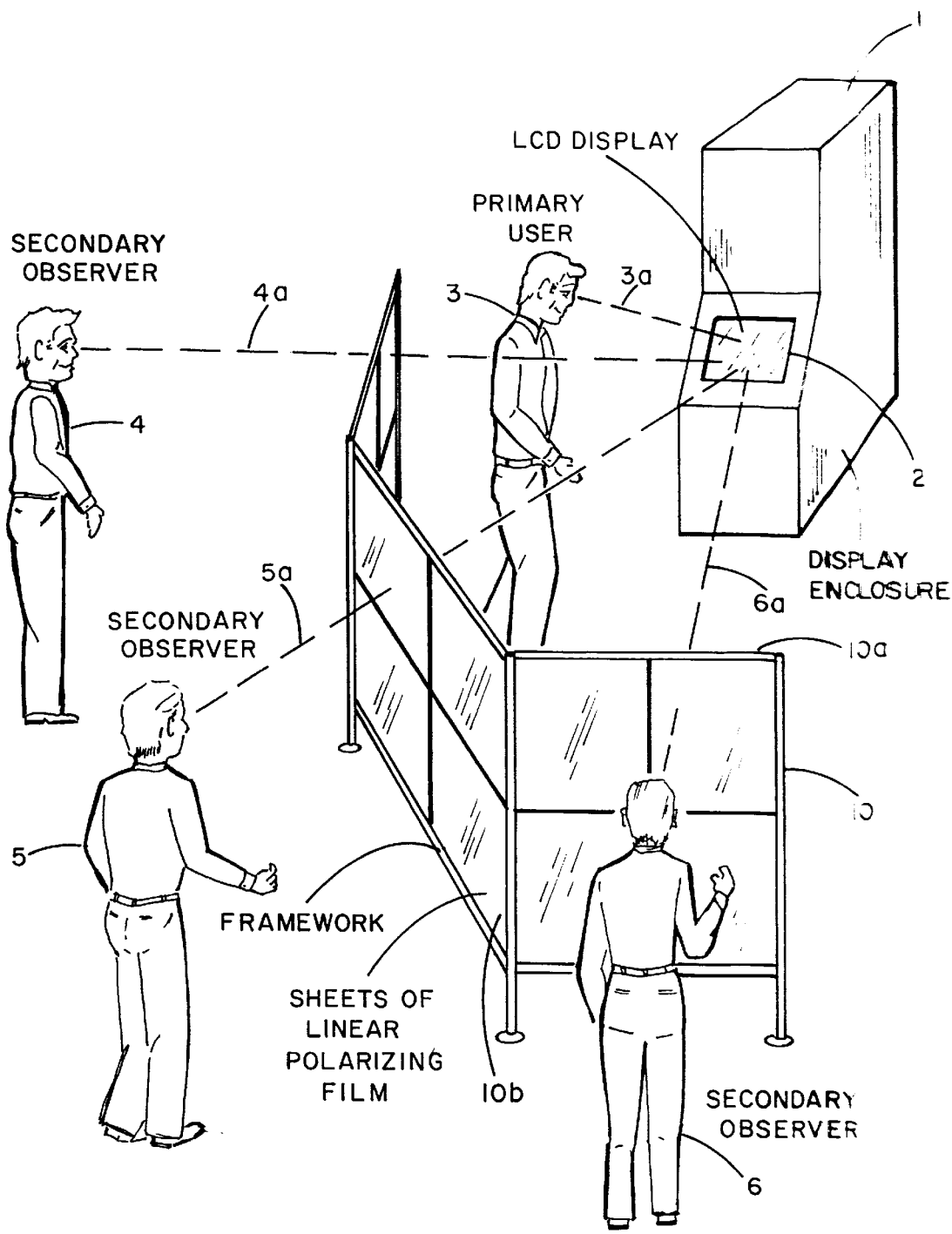
FIG. 2 shows an embodiment of the present invention in place such that secondary observers are prevented from viewing the screen of a device when in use by a user.

FIG. 2 presents an embodiment of the present invention. As shown in FIG. 2, the primary user 3 uses a device 1, such as an ATM/CAT, PC, or other device having a typical LCD display 2. The user 3 is able to view the LCD display 2 along the primary user's line of sight 3a without the aid of any other devices, such as polarized glasses.

A partition screen 10, an embodiment of which includes a framework 10a for sheets of linear polarizing film 10b, is placed such that the partition screen 10 intersects with the lines of sight 4a, 5a, 6a of secondary observers 4, 5, 6. The sheets of linear polarized film 10b allow only light that is polarized in the direction of light polarization defined by each individual sheet of polarizing film 10b to pass through each sheet. This polarized light allows the secondary observers 4, 5, 6 to view the device 1, because light reflected from device 1 is unpolarized, that is polarized in every direction. The secondary observers 4, 5, 6 see only that light reflected from the device 1 that is polarized in alignment with the polarizing film 10b. However, the sheets of polarizing film 10b are oriented such that the direction of light polarization through the sheets of polarizing film 10b is substantially perpendicular to the direction of polarization of light emitted from the LCD display 2. Thus, light emitted from the LCD display 2 is blocked from view along the lines of sight 4a, 5a, 6a of the secondary observers 4, 5, 6. This blocking of view occurs regardless of the direction of viewing of the secondary observers 4, 5, 6, so long as the partition screen 10 intersects with the lines of sight 4a, 5a, 6a of the secondary observers 4, 5,,6, and the direction of polarization for each specific sheet of polarizing sheet 10b that intersects each specific line of sight 4a, 5a, 6a is substantially perpendicular to the direction of polarization of light emitted from the LCD display 2 along lines of sight 4a, 5a, 6a. Thus, the direction of polarization will be different for each sheet of polarizing film 10b that is installed on framework 10a.

The optimal orientation of each specific sheet of polarizing film 10b can be readily established by individual adjustment. That is, each sheet of polarizing film 10b is placed in position on frame 10a, then rotated while a secondary observer 4, for example, observes the LCD display 2 along line of sight 4a. The optimal orientation occurs when secondary observer 4, for example, sees no light from LCD display 2 along line of sight 4a. As a result, the appearance of the LCD display 2 to the secondary observers 4, 5, 6 is as a dark screen, with no light emission viewable by the secondary observers 4, 5, 6.

Embodiments of the present invention have now been described in fulfillment of the above objects. It will be appreciated tat these examples are merely illustrative of the invention. Many variations and modifications will be apparent to those skilled in the art.

What is claimed is:

1. A system for a user to view information displayed on a terminal along a first line of sight from the user to the terminal, while preventing an observer from viewing the information displayed along a second line of sight from the observer to the terminal, comprising:

a polarized display screen for the terminal, wherein the polarized display screen has a first direction of polarization and wherein the information displayed on the polarized display screen is visible to the user without additional polarization along the first line of sight, said user at a first distance from said screen;

a polarizing partition having a second direction of polarization; wherein at least a portion of said partition is located at a distance greater than said first distance from said screen; and wherein the second direction of polarization is substantially perpendicular to the first direction of polarization, such that the information displayed on the polarized display is not readily visible to the observer when the polarizing partition intersects the second line of sight;

a framework;

a first sheet of linear polarizing film positioned within the framework; wherein the polarizing partition comprises the framework; and at least a second sheet of linear polarizing film positioned within the framework; wherein the at least second sheet of linear polarizing film is oriented differently than the first sheet of linear polarizing film;

wherein the polarizing partition is located such that the user may view the terminal without the polarizing partition intersecting the first line of sight; and wherein the polarizing partition is located such that the polarizing partition intersects the second line of sight of the observer.

2. The system of claim 1 wherein the terminal is an automatic teller machine.

3. The system of claim 1 wherein the terminal is a customer access terminal.

4. The system of claim 1 wherein the terminal is a personal computer.

5. The system of claim 1 wherein the polarized display screen comprises a liquid crystal display.

6. The system of claim 1 wherein the polarizing partition comprises an access opening.

7. The system of claim 6 wherein the access opening comprises a door.

* * * * *